Nov. 30, 1948.    H. W. McQUAID    2,455,020
ECLIPTIC FLASHER LAMP
Filed Nov. 10, 1944

H. W. McQuaid,
INVENTOR;
By Frederick E. Maynard,
Attorney.

Patented Nov. 30, 1948

2,455,020

UNITED STATES PATENT OFFICE 2,455,020

ECLIPTIC FLASHER LAMP

Harry W. McQuaid, Los Angeles, Calif.

Application November 10, 1944, Serial No. 562,885

3 Claims. (Cl. 40—130)

This discovery is in the art of on-and-off electric flasher lamps and the inventive concept thereof embodies mechanical means in combination to effect a total or a partial eclipse of light from a related source, other than by the making and breaking of an electric circuit or circuits.

In certain adaptations of lamp devices, as for instance in congregational or general public displays it is desirable to produce special lighting effects according to the ultimate result in view; which are too numerous to need recitation, and a purpose of this invention is to provide a mechanical action lamp of the utmost simplicity, of very low construction cost and selling price, and operational expense, which is substantial and practicable in structure, needs no expert labor service in upkeep, and can readily be installed in display locale, and involves but a single moving shutter which can be rotatively driven and positively controlled by a simple shaft motivated by any suitable medium; preferably a regularly timed shaft.

The lamp of this invention has in view the provision of cooperative means whereby to effect the instantaneous eclipse or the partial eclipse of a flood of light from a related source or sources in periods of successive eclipses of any desired time length, and especially it is a purpose of the invention to effect such a result solely by cooperation of a pair of light passing members which have relative rotation and are provided with systems of windows and shutter segments of such character and relation to at a moment all pass light from a near source to secure full effulgence at said members, and at the next moment to totally or nearly totally eclipse the light stream without cyclic travel effect; in other words to provide an intermittent flashing burst of light from the lamp with intervening complete or nearly complete blackouts.

Further, the invention has as an objective to conceal the primary source or sources of light and to gather and reflect the flood of light to the windowed parts of the lamp, and in this connection a desideratum is to provide a plurality of sources of light of different color which may be utilized either selectively or in combination to give multitudinous colors to the light from the lamp.

And, noticeably, a purpose of the invention is to provide a lamp in which plural sources of light are so isolated one from the other that separate portions of the lamp unit may be illuminated wholly without light aid from other sources but altogether cooperative in attaining an intended display by the lamp.

The discovery resides in certain novel conceptions improving the art as set forth in the ensuing text and having, with the above, additional purposes and advantages as hereinafter developed, and whose constructions, combinations and details of means, and the manner of operation will be made manifest in the following description of the herewith illustrative embodiments; it being understood that modifications, variations and adaptations may be resorted to within the scope, spirit and principle of the invention as it is more directly claimed presently.

Figure 1:
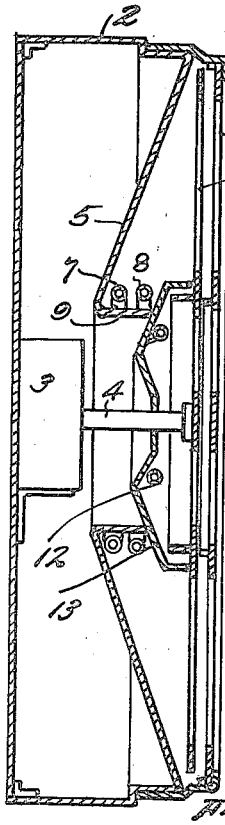
Figure 1 is a diametrical section of the lamp.

The illustrated lamp includes a box or drum 2 of any suitable size, shape and material, preferably opaque, and here provided with a suitable motor 3 driving a central shaft 4 at any desired rate of rotation; as one full turn per minute in the presented instance to effect a low number of total or substantially total eclipses of the lamp light, this being slow enough to escape persistence of vision.

In the drum is a rigid wall 5 through which the central shaft passes and has fixed on its forward end a positive action discal shutter 6 of opaque or translucent material as desired according to intent of results, and if translucent, of any desired color. The back face of the shutter is preferably of a highly light reflecting capacity whereby to cast light from a source such as one or more luminous tubes 7 and 8 disposed between the shutter 6 and the wall 5, which also is of highly reflective capacity.

The light tubes may be located at any desired position concentrically, here about the shaft 4 but preferably are disposed in an annular channel 9 to preferably conceal the tubes from direct view at the face of the lamp. The surface of the channel next to the tubes 7 and 8 is highly reflective to throw out as much as possible of intercepted light toward the front of the wall 5 which is here shown as concaved in an effective shape to reflect all possible light forward to the rotative shutter.

A distinct feature of this invention is the provision in the shutter 6 and in the face plate 10 of systems of light transmitting windows and intermediate light intercepting segments whereby to effect full, successive or partially full eclipses of the source light. To accomplish this effect the shutter has a suitable number of narrow radial windows 6w which may be wholly clear, or translucent and of any desired color if so. The face plate 10 has a number of similar, radial windows 10w exactly equal to the number of windows in the shutter. In these members, the shutter and the face plate, the windows are, in each, laterally separated by radial segments 6s and 10s, respectively, which are materially wider than their related windows so that if all windows are at one instant of time directly opposite, in both systems, then a flood of light will show through the face plate and be visible as a substantial disc of light composed of close, radial beams; which may be of any desired radial length as to the center of the lamp.

It will be seen that the narrower windows pass back of the somewhat wider segments 10s of the front plate 10, and since the number of these wide segments is equal to the number of windows in the shutter then all light will be eclipsed as the segments of the shutter fully register with the windows 10w of the face plate. The obscuration will be but momentary and light will again burst forth in the form of a large uninterrupted, effulgent, discal ring composed of the separated beams coming concurrently through all the radial windows of the two members 6 and 10, as their windows again register. The discal light bursts will be as many per minute as there are windows in the balanced systems of the two light controlling members 6 and 10: thirty-two are shown, as an example, and assuming one rotation of the shutter per minute.

Figure 3:
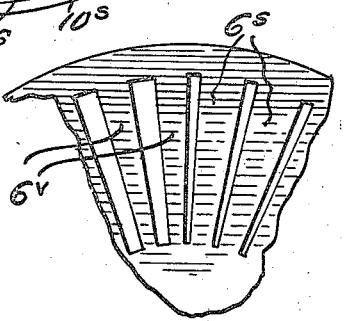
Figure 3 is a fragment of a modified inner shutter with windows designed for a partial eclipse and swaying shadow effect in the emitted light.

A decidedly attractive lighting effect is had by providing haphazardly disposed segments, in either or both of the members 6 and 10, of widths different from the widths of other segments of the related system. In Fig. 3 the shutter 6 has wide segments 6s and variant segments 6v. The light effect resulting is not a total eclipse at any instant in the cycle of the shutter 6 and has an illusion of a black cloud or shadow swaying on the face of the lamp with intervals of full ring zone light burst. The identical effect is repeated at each cycle of the shutter but without any circular drifting effect of the observed light burst.

Figure 2:
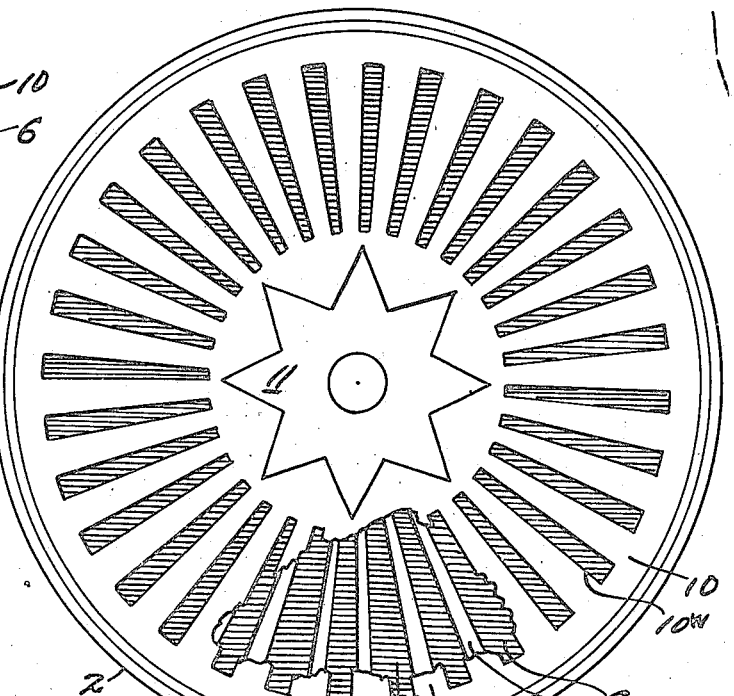
Figure 2 is a frontal view with a portion of a front or face plate broken away to show a portion of an inner rotary shutter.

This ecliptic effect may be employed in a lamp having a front plate 10 provided with constantly active, light passing areas to produce highly desirous results. Fig. 2 shows how the center of the plate 10 as having a light passing window (here a star) 11 with points near the inner ends of the radial windows 11. This window 11 receives light generated by a light tube 12 shielded in a shell 13 isolating it from the tubes 7 and 8 and these from the window 11, and stopping light from the tube 12 spreading to the aforesaid shutter windows. As shown, the shell 13 may form one wall of the channel device above described, for constructional purposes. It is obvious that the light tubes may be constant or intermittent in operation to produce the desired light effects and combinations from the shutter 6, and may be of any color, as also may the patterned window, and all reflecting surfaces may have desired colors. The manner of construction of the light control parts as to light emitting windows and as to light intercepting features is one of choice to the artisan, and no specific embodiment is claimed.

Figure 4:
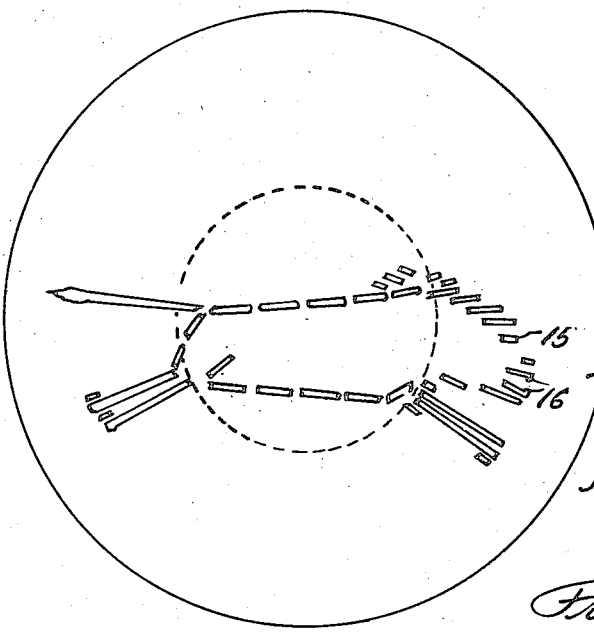
Figure 4 is a front view of a front plate with windows designed to give animated or life-like effects to a desired subject, such as wind-motion of trees or limb motion to animal figures.

To secure an animated effect by the lighted lamp a face plate 10' is shown in Fig. 4 as having a stationary window outline 14 of animal form and with the limbs and the tail thereof at such positions and angle that as the radial windows 6w of the lamp shutter 6 pass the limbs and the tail light will flash on and off to give animal motion effect to the observer's view. Eye and mouth windows 15 and 16 will enhance the animal resemblance as light flashes.

Since all of the radial windows flash on at one time and then off at one time there is no rotational or travelling impression of the emitted light around the face of the lamp. That would destroy the discal burst effect here had by light coming out at one instant from all of the front windows of the lamp; even when the central window 11 is constantly lighted.

What is claimed is:

1. A flashing lamp including a source of light, coordinate light controlling and relatively movable members and means to effect said movement; said members having circular systems of equinumerous, concurrently registerable windows for the emission of the light and certain zone groups of the windows being of differentiated light emitting areas whereby to produce the effect of lateral swaying and expanding and contracting spot zones during the periods of registration of the differentiated windows while the remaining windows of the systems are all blocking out the light.

2. An alternately flashing and black out lamp including a source of light, and means for substantially fully blocking out light from said source and flashing the light in circular zone in alternate actions, and including coordinate, light controlling members and means for relatively moving them; said members having circular systems of equinumerant windows concurrently registerable for the instantaneous effulgence of light from the windows in a generally annular zone effect and whereby nearly all of the light is stopped out at one time when the windows are out of register; certain of the windows being differentiated in area to emit light while the remaining windows are out of register and stop light flow, to get the effect of small light zones intermittently between periods of full effulgence from the registered systems.

3. The lamp of claim 2; the windows being of non-rectangular form.

HARRY W. McQUAID.

REFERENCES CITED

The following references are of record in the file of this patent:

UNITED STATES PATENTS

| Number | Name | Date |
| --- | --- | --- |
| 1,679,167 | Nolan | July 31, 1928 |
| 2,097,123 | Hotchner | Oct. 26, 1937 |
| 2,363,566 | Aldis | Nov. 24, 1944 |